INVENTOR:
ELIAS ORSHANSKY, JR.
BY
ATTORNEYS

May 21, 1963 E. ORSHANSKY, JR 3,090,361
HYDRAULIC MOTOR
Filed Sept. 28, 1961 6 Sheets-Sheet 4
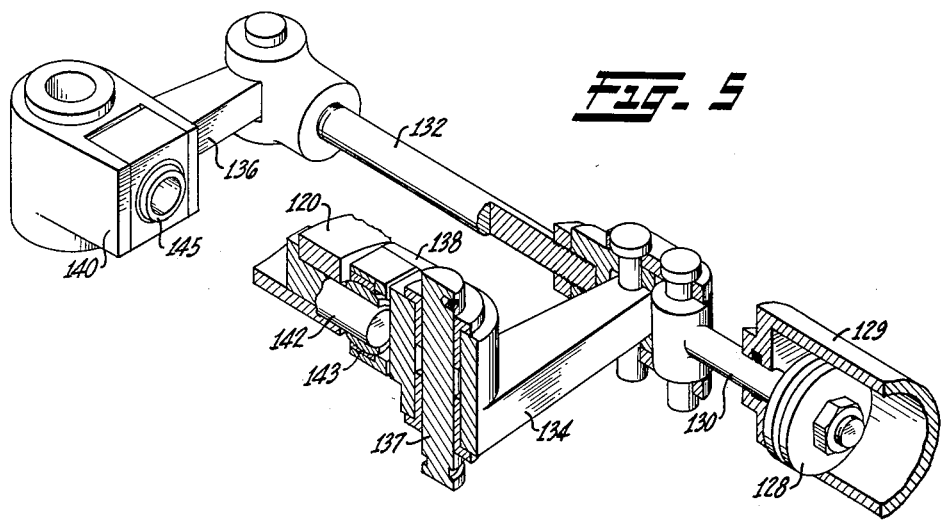
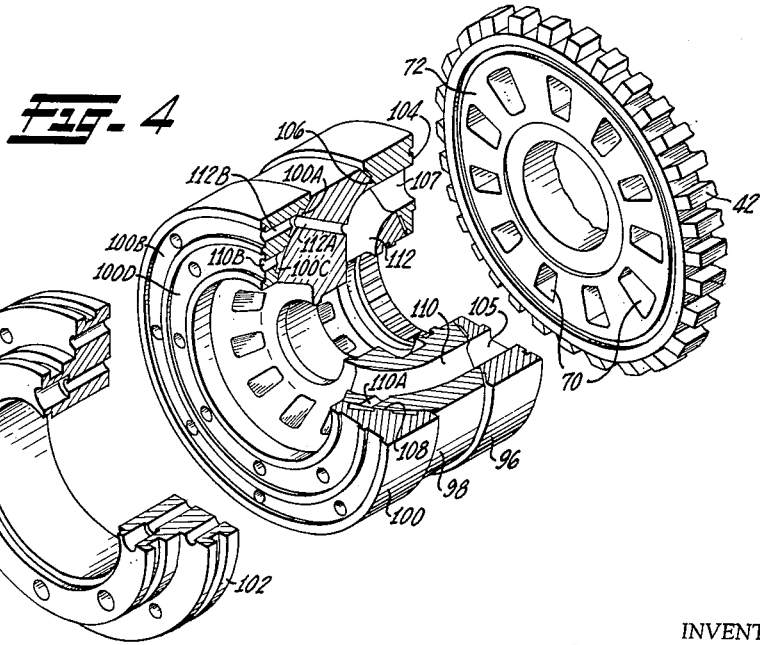
INVENTOR:
ELIAS ORSHANSKY, JR.
BY
ATTORNEYS May 21, 1963     E. ORSHANSKY, JR     3,090,361
HYDRAULIC MOTOR Filed Sept. 28, 1961     6 Sheets-Sheet 5

INVENTOR:
ELIAS ORSHANSKY, JR.
BY
ATTORNEYS

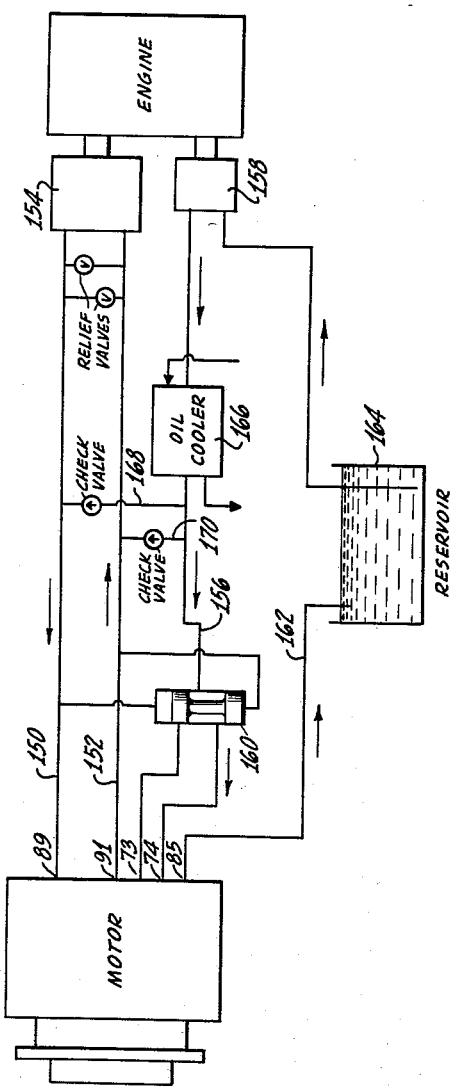

United States Patent Office 3,090,361
Patented May 21, 1963

3,090,361
HYDRAULIC MOTOR
Elias Orshansky, Jr., San Francisco, Calif.
Filed Sept. 28, 1961, Ser. No. 141,327
13 Claims. (Cl. 121—61)

This invention relates to a hydraulic motor and more particularly relates to a hydraulic motor which is suitable for use as a wheel motor in a vehicle although it will be obvious that this is only one of the many possible applications of the motor.

In heavy duty vehicles, it is important to provide a drive which provides an efficient conversion of energy into tractive power under all operating conditions. Only an infinitely variable ratio transmission can make it possible to operate the engine under the proper speed and torque conditions for maximum efficiency regardless of the demand of the wheels. Thus, the transmission of the present invention provides the necessary high torque for starting and at the same time allows efficient high speed operation.

Therefore one object of the present invention is to provide a hydraulic motor for use in vehicles which permits an efficient conversion of energy under all driving conditions.

Another object of this invention is to provide a drive system which is cheap, simple, light, small and reliable.

Another object of this invention is to provide a hydraulic motor which has self-alignment features and which does not require extremely exacting manufacturing tolerances.

Another object of this invention is to provide a novel sealing mechanism for the valve structure which is efficient and reliable and which compensates for thermal expansion, deflection and manufacturing tolerances.

Another object of this invention is to provide a piston support structure having a square crosshead to minimize the effects of side loading.

Another object of this invention is to provide a multiple cylinder hydraulic motor having cross firing to minimize bearing loading.

Still another object of this invention is to provide a hydraulic motor wherein the pistons are provided with self-aligning bearings.

Other objects will be apparent from the specification that follows.

In the drawings forming a part of this application:

FIGURE 4 is an exploded view showing the relationship between the valve ports and the novel sealing mechanism of the present invention.

FIGURE 5 is an enlarged perspective view, partially in section, of the mechanism for actuating the cams.

FIGURE 10 is a schematic diagram of a device embodying the present invention.

Figure 1:
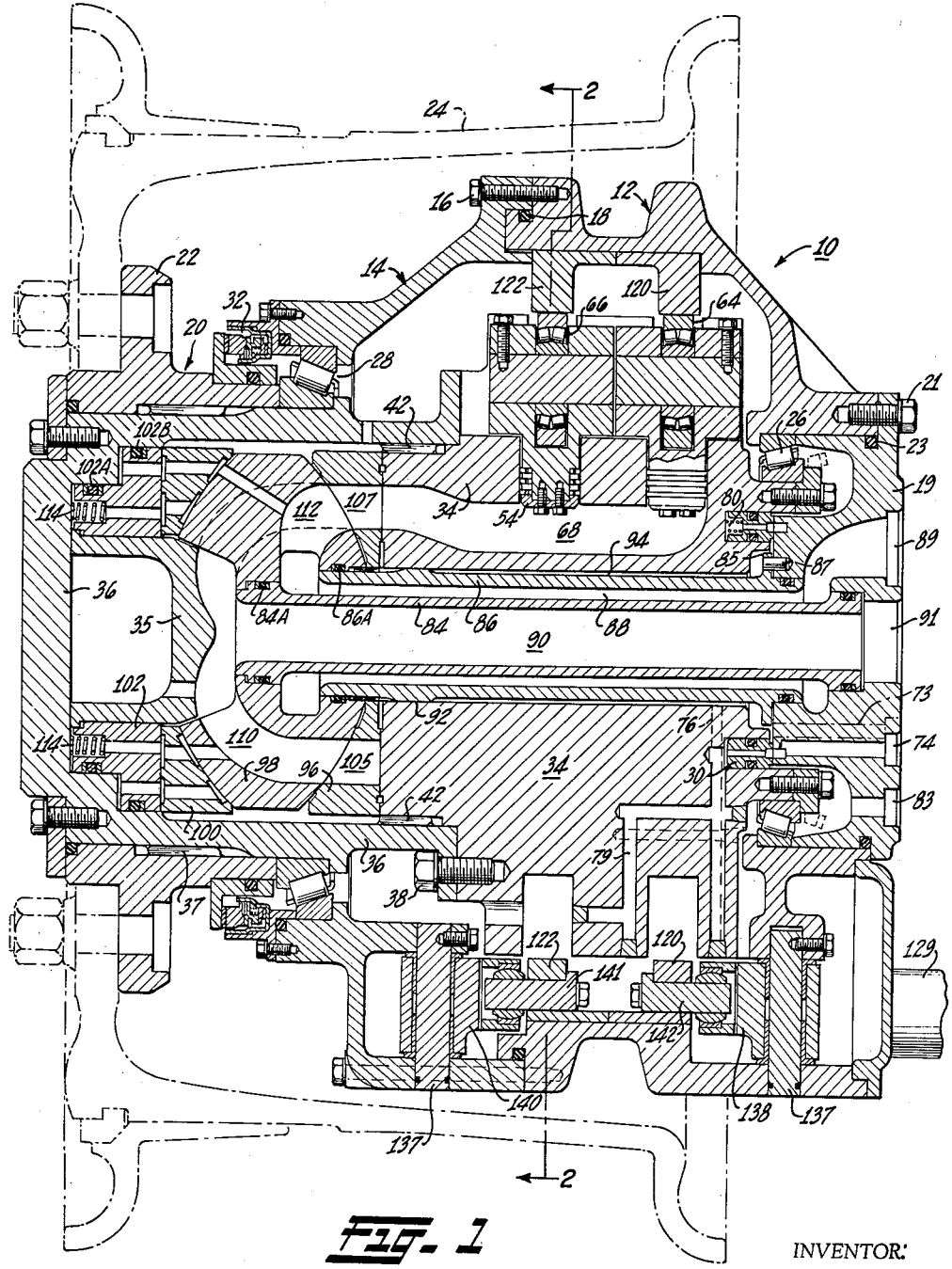
FIGURE 1 is a side sectional view of a motor embodying the present invention.
Figure 2:
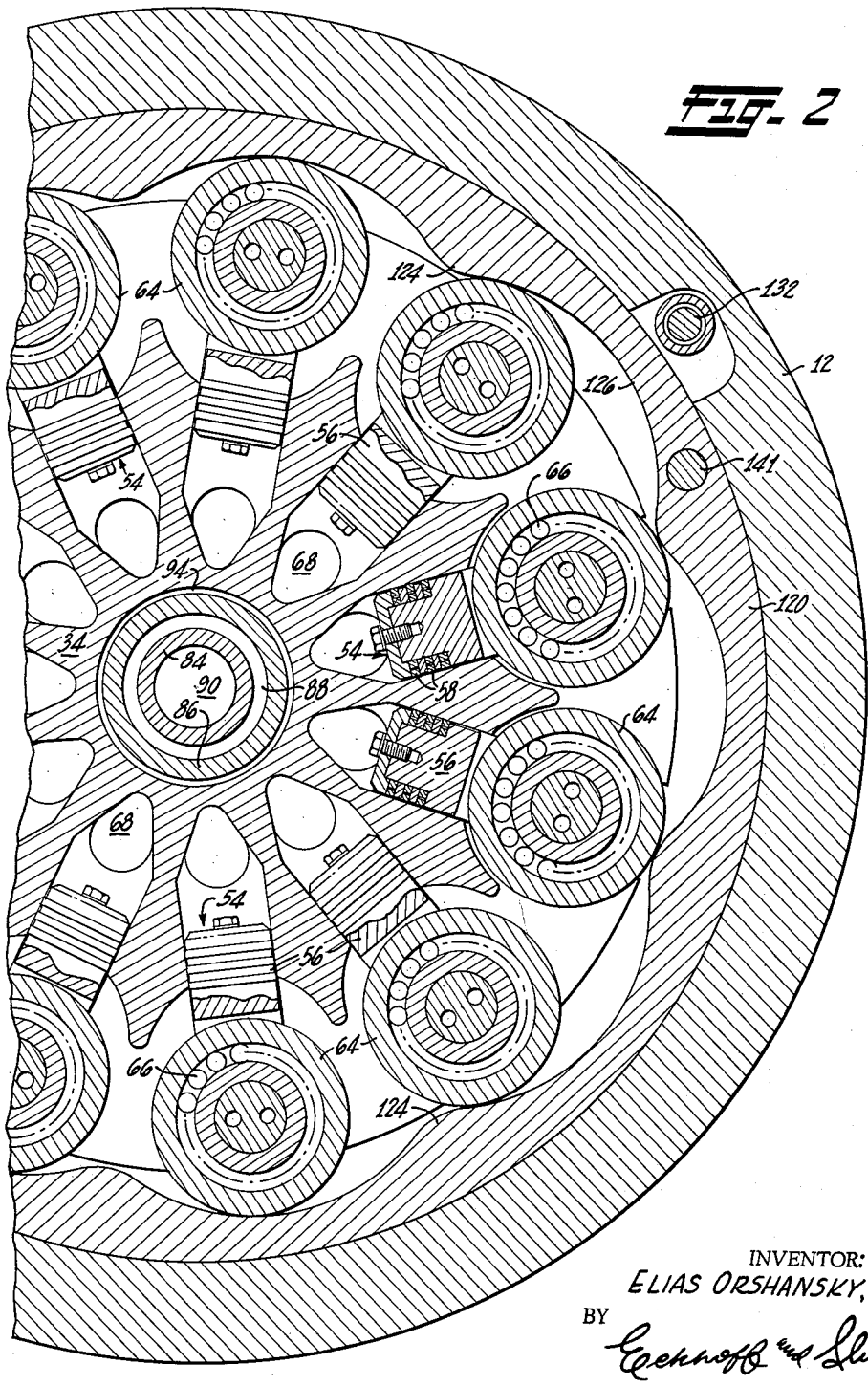
FIGURE 2 is an enlarge sectional view on the lines 2—2 of FIGURE 1.

Turning now to a description of the drawings by reference characters there is shown a motor having an exterior housing 10 which is stationary and which may be fastened to the body of a vehicle by suitable brackets, not shown. Preferably the housing 10 is made in three pieces, namely an inner housing section 12, and an outer housing section 14, which sections are fastened together by suitable bolts 16 and provided with a sealing O-ring 18, and an end plate 19 held in place by bolts 21 and provided with O-ring 23.

Mounted within the housing is the rotating hub generally designated 20 having flange 22 thereon to which a vehicle wheel 24 may be attached. The hub 20 is supported within the housing 10 by means of the inner roller bearing 28. It will be seen from the drawings that the bearings are so arranged that thrust as well as radial loads are absorbed. An outer seal 32 is provided to provide against the loss of lubricant and/or the ingress of dirt and moisture.

The rotating cylinder block generally designated 34 forms a continuation of the hub structure 20, but for manufacturing convenience it is made as a separate piece and is fastened to the outer hub 36 by means of the bolts 38 which pass through the holes 40 of the cylinder block. Since the cylinder block 34 must transmit all of the power developed by the motor to the outer hub 36, the cylinder block 34 is also provided with splines 42 which fit into mating splines on the outer hub. A spline 37 is provided between the outer hub 36 and the flange 22 also to transmit torque. The cylinder block 34 is provided with an inner bank of cylinders 44 and an outer bank of cylinders 46. The cylinder block 34 is also provided with the central guide members 48, the inner guide members 50 and the outer guide members 52.

Figure 7:
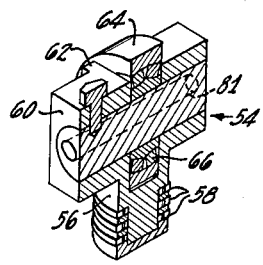
FIGURE 7 is a perspective sectional view of one of the pistons and crossheads.

The pistons themselves, as is best seen in FIGURE 7, are generally designated 54 and comprise a piston 56 provided with rings 58, said piston having an integral rectangular crosshead 60. The crosshead 60 also has projections 62 thereon so that the piston is held steady in all positions. Each piston is provided with a cam follower 64 which is mounted on the piston by means of two rows of self-aligning spherical rollers 66 which are set at an angle to each other, as shown, so that the cam follower 64 can wobble slightly to compensate for minor manufacturing tolerances in either the cam rings which are hereafter described or the cylinder block itself. Each set of the cylinders 44 and 46 is connected with a manifold 68 which in turn leads to one of the oil ports 70. The oil port 70 terminates in the flat face 72 of the cylinder block. The cylinder block is also provided with oil passages, the exact location and function of which is hereinafter described in connection with the lubrication system.

Mounted within the cylinder block 34 and attached to the plate 19 are the tubes for supplying high pressure oil for operating the motor and returning the low pressure oil. These comprise an inner tube 84 and an outer tube 86 so that two passages are thus provided, one a first passage 88 in the annular space between the two tubes and a second passage 90 formed by the inner tube leading to the connections 89 and 91 respectively. The outer tube 86 does not come in contact with the rotating cylinder block except at the small area of contact provided by the pilot land 92, leaving a substantial clearance 94 between substantially the entire length of the outer tube 86 and the cylinder block 34. The space 94 is used as a lubrication oil passage and also permits some freedom of motion to compensate for run-out of the cylinder block. The outer tube 86 is maintained in position with respect to housing 10 by the pin 87 passing through flange 85.

Figure 9:
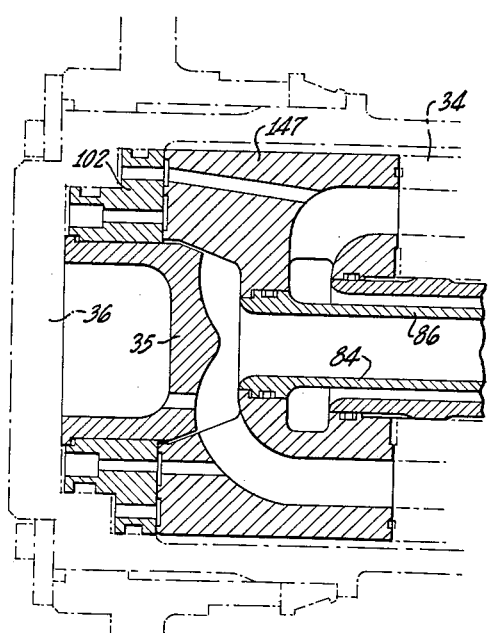
FIGURE 9 is a sectional view, on the same scale as FIGURE 1, showing an alternate form of sealing mechanism which may be used when the sealing requirements are not so rigorous as in the motor shown in FIGURE 1, e.g. for use in motors of small size where simplicity is desired.
Figure 8:
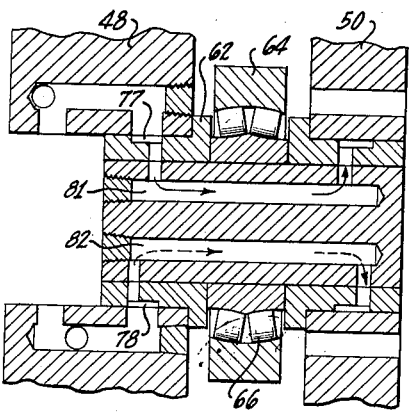
FIGURE 8 is an enlarged sectional view looking down on a piston guide and crosshead.

Preferably the valve structure is constructed as is shown in FIGURES 1 and 4 although, as will be later explained, a simplified form of valve structure is shown in FIGURE 9. Referring now specifically to FIGURE 4, the valve structure includes four ringlike members designated 96, 98, 100 and 102. The first two of these members, 96 and 98, are held stationary by spline 97 on tube 86 while the third and fourth members 100 and 102 are permitted to float. The first member 96 has a first flat face 104 mating with the face 72 and a plurality of openings 105 and 107. The openings 105 and 107 correspond substantially in size and shape to the openings 70. The members of openings 105 and 107 are each equal in number to the number of lobes on one of the cam rings as hereinafter described. The opposite face of the ringlike member 96 is hemispherical as at 106 to mate with a corresponding hemispherical face on the ring 98. Similarly, the ring 100 has a hemispherical face 108 mating with a like face on the ring 98. The hemispherical structure described provides all degrees of freedom for compensating for out-of-squareness, runout, deflection or the like. As will be seen from FIGURE 4, ports 105 are connected to the passage 90 by the opening 110, and the alternate ports 107 are connected to the space 88 by the openings 112. The member 102 does not revolve but is pressed by means of the springs 114 against the assembly to give a preloading effect and, after pressure is applied, the overbalance in oil pressure maintains the assembly so that each of the annular rings is in face-to-face engagement and a good oil seal is provided. This is achieved by means of the first pair of annular grooves 100A and 100B and the second pair of annular grooves 100C and 100D on the ring 100. The first pair of grooves is connected to the passage 112 by means of the openings 112A and 112B while the second pair is connected to the passage 110 by the openings 110A and 110B. It will be understood that the projected areas of each of the grooves is such that regardless of whether passage 110 or 112 is under pressure, the whole assembly will be pressed together with a force greater than the force tending to separate ring 96 from the cylinder block 34 so that a substantially leak proof seal is provided at the valve openings. Further, the O-rings 84A and 86A prevent leakage between the tubes and the ring 98, regardless of which line is under pressure. Similarly, O-rings 102A and 102B prevent leakage around ring 102.

The guide 35 achieves streamline flow.

Arranged within the housing 10 are the two cam rings 120 and 122. The two cam rings have a series of lobes 124 and valleys 126 and are substantially identical in structure. In the embodiment illustrated, each of the cams has nine lobes and there are eleven cylinders in each bank so that the forces are well distributed and none of the pistons are exactly in phase with each other. The two cam rings 120 and 122 have a limited movement relative to each other which movement is imparted by means of a cam actuating piston 128 in cylinder 129 shown in FIGURE 5. The piston 128 is linked to the rod 130 and the tie rod 132 to the two bell cranks 134 and 136 supported in housing 10 by pins 137. Each of the bell cranks has an extending fork 138 and 140 respectively at right angles thereto each of which is in turn connected with the pins 141 and 142 by means of ball and socket joints 143 and 145 which fit in slidable square blocks in the forks as shown. Pin 142 is attached to cam ring 120. Thus, the cams can be given limited rotational movement in opposite directions relative to each other around a common midpoint. It will be obvious since adjacent pairs of pistons are fed from the same source that the displacement will depend on the relative position of the two cams. Thus, if the lobes and valleys of the two cams correspond, the effective displacement will be at a maximum while the effective displacement can be zero if the valleys of one cam are set opposite the lobes of the adjacent cam. Thus by merely shifting the position of the two cams around a common point, which common point is, of course, determined by the relationship with the openings 105 and 107, the motor can operate at maximum displacement for low speed, high torque operation or at a very low displacement for high speed, low torque operation, or any condition in between, merely by changing the settings of the cams. One of the connections 89 and 91 is supplied with high pressure oil while the other is used as an oil return, depending on the direction of rotation desired.

In FIGURE 9 an alternate embodiment of the valve plate arrangement is shown wherein the parts designated 96, 98 and 100 have been combined in a single piece designated 147. Here the annular ring 102 forces the ring 147 against the cylinder block 34. Since the two hemispherical seats previously described which were provided to take up any minor variations in manufacturing are no longer present this construction requires greater precision since the mating parts must all be parallel, but is well suited for use in relatively small structures where it is not so difficult to achieve the necessary tolerances.

Figure 3:
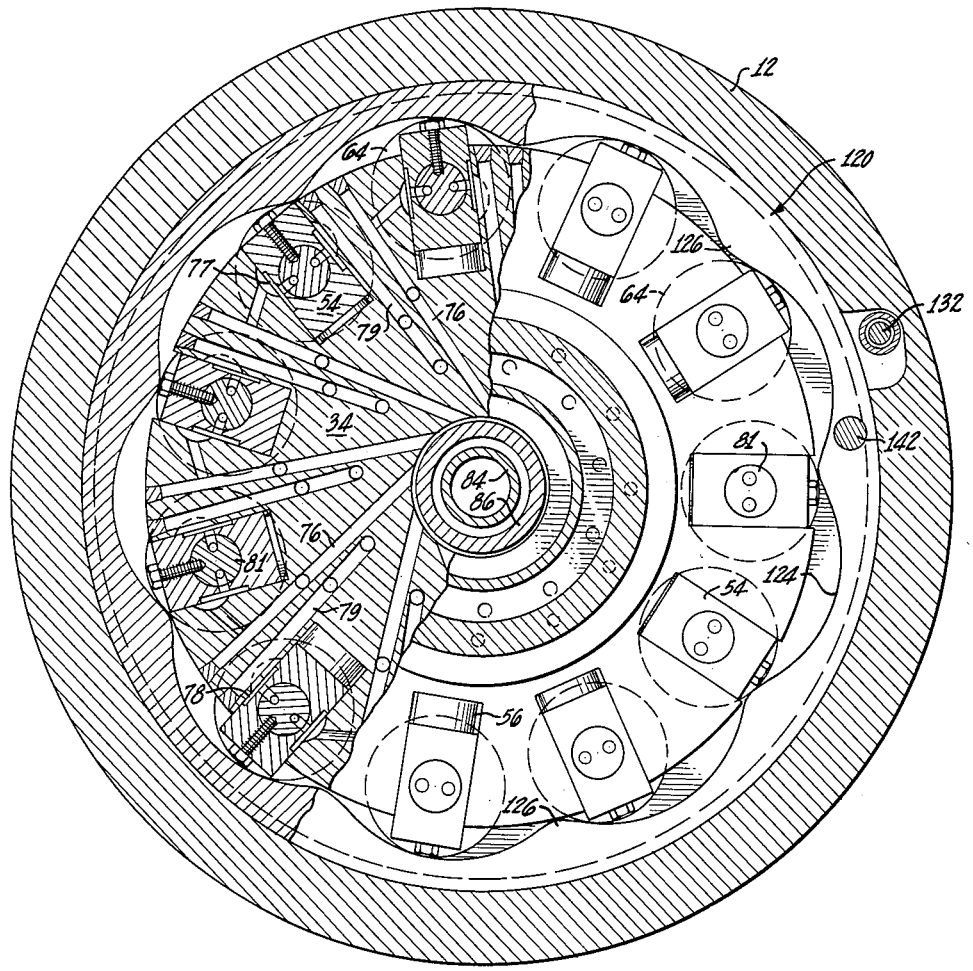
FIGURE 3 is a sectional view through the motor on two planes showing the relationship between the pistons and the lubrication ports.
Figure 6:
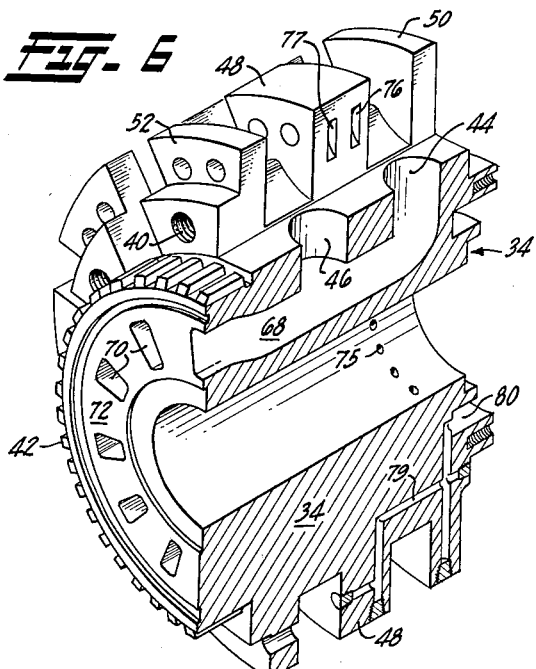
FIGURE 6 is a perspective view, partially in section, of the rotating cylinder block showing the piston guides.

The direction of rotation of the motor is determined by whether high pressure oil is supplied to connection 89 or 91. The lubrication needs of the motor will depend to a degree on the direction of rotation so that connections 73 and 74 are provided for introducing oil, the connection chosen for introduction being dependent upon the direction of rotation so that the oil will always be supplied to the thrust side. Connection 73 leads to the annular space 94 where the oil can go through openings 75 into lines 76 which terminate in openings 77 in one face of the crosshead support members. Corresponding openings 78 in the opposite faces (not shown in FIGURE 6 but visible in FIGURE 3) lead to line 79 which in turn leads to the oil groove 80 whence the oil can flow through the opening in seal 30 to connection 74. The pistons are provided with cross lines 81 and 82 for conveying oil to the faces of the crosshead supports which are not supplied with direct oil lines but which are being operated under thrust. No oil is directly supplied to the antithrust sides.

A drain opening 83 is provided for the removal of oil from the housing and excess lubricating oil and seepage oil from the operation of the motor is drawn from this opening.

In FIGURE 10 there is shown a schematic diagram of the method of operation of the motor of the present invention. High pressure oil is supplied either through the line 150 for the operation of the motor while low pressure oil is returned to line 152 or vice versa. Oil is supplied by the drive pump 154 which pump may be reversible or which may have a reversing valve so that either line 150 or 152 can be used as the high pressure side. Lubricating oil is supplied to the motor by line 156 from the supercharge pump 158. The shuttle valve 160 is connected to the lines 150 and 152 so that the lubricating oil from line 156 will be supplied to the connection 73 or the connection 74 depending on whether line 150 or 152 is the high pressure side. As has been previously mentioned, the connection 83 is a drainage connection and oil from this connection is passed through the line 162 to the reservoir 164 whence it is drawn by the supercharge pump 158, passed through cooler 166 into line 156 for lubrication purposes, while a portion of the oil is used as make-up oil and is passed through either line 168 or 170 through the check valves on each of these lines (it being understood that the oil will pass into whichever is the low pressure line) and into the pump 154 for pressurization to the operating pressure desired for the motor.

Although this device has been described as a motor, it will be obvious that it could also be operated as a pump.

The motor has been described as having eleven pistons per bank and nine lobes on each of the cams. These numbers have been established by trial and error as being optimum for a large military vehicle but it will be obvious to those skilled in the art that a smaller or larger number of pistons or lobes might be used. The purpose of having many cam lobes is to permit the pistons to make many strokes per revolution so that the motor develops much more torque than a motor would of similar dimensions wherein only one stroke per revolution is made. However, there is a practical upper limit to the number of lobes which can be used since the greater the number of lobes, the sharper the cam peaks and the greater the tendency of the cam follower to jump off of the peaks as speed is increased. Furthermore, the number of inlet and outlet ports has to be equal to the number of lobes so that as the number becomes larger, the ports must become smaller, constricting fluid flow if the number becomes too large. Likewise the number of cylinders can be varied and generally it is preferred to use an odd number of cylinders since this results in a smoother fluid flow than an even number. If fewer cylinders are employed, the cam roller bearing loading must be larger and force acting upon the cam followers becomes high, requiring large diameter cam followers. Generally speaking, the number of lobes and the number of pistons, per bank, should not be divisible by whole number since the flow will become very rough and the operation of the motor will be equivalent to that of one having only two or three pistons, since several of the pistons will be firing at the same time. There should not be the same number of pistons as there are lobes since this is equivalent to a one-cylinder motor which can stop on dead center. By selecting a proper number of cam lobes and cylinders, such as 9 and 11, two things are achieved:

First, the radial loads on bearings 26 and 28 are substantially balanced out.

Second, the moment produced by the separating force of the valve plate about its center is substantially reduced, making it possible to balance the separating forces of the valve plate faces by constant areas 100A and B and 100C and D.

I claim:

1. A fluid-operated motor comprising a stationary housing; a hub mounted for rotation within said housing and extending from one end of the housing; a cylinder block fastened to the hub having a plurality of pairs of cylinders radially therein, each pair of cylinders leading to a manifold common for that pair whereby a plurality of manifolds is provided, each manifold terminating in a port in a rotating valve plate formed by a flat face on said cylinder block; pistons in each of said cylinders, each piston having a cam follower facing outwardly therefrom; a pair of annular cam rings mounted within said housing, the cam followers of one of each pair of pistons running on each of said cam rings; a plurality of lobes on each of said rings, each ring having the same number of lobes; a stationary valve plate in contact with said rotating valve plate, said stationary valve plate having alternate inlet and outlet openings, the number of each of the inlet and outlet openings being equal to the number of lobes on one of the cam rings; means for rotating the positions of said cam rings in opposite directions about a common point, said common point being indexed on the openings of the stationary valve plate; and means for supplying high pressure oil to the inlet openings and removing low pressure oil from the outlet openings.

2. The structure of claim 1 wherein each of the cam followers is provided with self-aligning bearing whereby the cam followers are self-aligning with respect to the cam rings.

3. The structure of claim 1 wherein the pistons are provided with integral rectangular crosshead members sliding in mating support members.

4. The structure of claim 1 wherein the pistons are provided with integral rectangular crosshead members sliding in mating support members with the thrust sides of said members being pressure lubricated and cooled.

5. The structure of claim 3 wherein each rectangular crosshead member is provided with a self-aligning bearing at the center thereof.

6. The structure of claim 3 wherein the lubrication and cooling system comprises a first set of oil lines and a second set of oil lines with means for supplying lubricating and cooling oil to one or the other of said lines depending on the direction of rotation of the motor.

7. The structure of claim 1 wherein the stationary valve plate is provided with an overbalancing mechanism whereby the two valve plates are forced together by a greater hydraulic force than the force tending to separate the valve plates.

8. The structure of claim 1 wherein the stationary valve plate is provided with a dual overbalancing system whereby the valve plates are forced together by a greater hydraulic force than the force tending to separate the plates regardless of which of the alternate openings are employed as inlet openings.

9. The structure of claim 8 wherein the stationary valve plate comprises ringlike members with hemispherical contact surfaces between the members whereby compensation is provided for misalignment between the valve plates.

10. The structure of claim 8 wherein the stationary valve plate comprises four ringlike members with at least two separate hemispherical contact surfaces between the members whereby compensation is provided for misalignment between the valve plates.

11. The structure of claim 1 wherein the number of pistons and the number of cam lobes is selected whereby the pistons will cross fire and minimize radial loading.

12. The structure of claim 1 wherein the inlet and outlet openings are respectively connected to inner and outer concentric tubes extending through the center of the cylinder block.

13. The structure of claim 1 wherein the stationary valve plate is aligned on the cylinder block whereby the stationary and moving valve plates are maintained in registration.

No references cited.